(12) United States Patent
Varnadoe et al.

(10) Patent No.: US 6,514,332 B2
(45) Date of Patent: Feb. 4, 2003

(54) COATING COMPOSITIONS CONTAINING METHYL/ETHYL ESTERS AND METHODS OF USING SAME

(75) Inventors: Glen R. Varnadoe, Lakeland, FL (US); Stacy K. Spence, Winter Haven, FL (US)

(73) Assignee: Arr-Maz Products, LP, a division of Process Chemicals, LLC, Winter Haven, FL (US)

( * ) Notice: Subject to any disclaimer, the term of this patent is extended or adjusted under 35 U.S.C. 154(b) by 0 days.

(21) Appl. No.: 10/053,815

(22) Filed: Jan. 22, 2002

(65) Prior Publication Data

US 2002/0148388 A1 Oct. 17, 2002

Related U.S. Application Data

(63) Continuation-in-part of application No. 09/784,570, filed on Feb. 15, 2001.

(51) Int. Cl.$^7$ .................. C09D 195/00; C09K 3/00; C10L 5/00; C10L 5/32
(52) U.S. Cl. .................. 106/269; 106/246; 106/248; 252/384; 427/212; 427/220; 44/500; 44/550; 44/602
(58) Field of Search ................. 106/246, 248, 106/269; 252/384; 427/212, 220; 71/64.12; 44/500, 550, 602

(56) References Cited

U.S. PATENT DOCUMENTS

| | | | |
|---|---|---|---|
| 2,225,570 A | | 12/1940 | Pfeiffer |
| 2,307,253 A | | 1/1943 | Yee et al. |
| 2,389,680 A | | 11/1945 | Mikeska |
| 2,877,129 A | * | 3/1959 | Hardman ............... 106/279 |
| 3,186,828 A | | 6/1965 | Baarson et al. |
| 3,219,433 A | | 11/1965 | Brewster et al. |
| 3,223,518 A | | 12/1965 | Hansen |
| 3,252,786 A | | 5/1966 | Bozzelli et al. |
| 3,306,730 A | | 2/1967 | Malmberg et al. |
| 4,081,264 A | | 3/1978 | Ali |
| 5,413,856 A | | 5/1995 | Swarup et al. |
| 5,578,118 A | | 11/1996 | Shuey et al. |
| 5,650,000 A | | 7/1997 | Shuey et al. |
| 5,968,222 A | * | 10/1999 | Kodali ............... 427/220 |
| 6,156,113 A | * | 12/2000 | Pasquier ............... 106/269 |
| 6,355,083 B1 | * | 3/2002 | Ogzewalla ............ 252/384 |

OTHER PUBLICATIONS

CAPLUS AN: 2000:584030, Gryglewicz et al, "Use of vegetable oils and fatty acid methyl esters . . . ", Jul. 25, 2000.*

* cited by examiner

Primary Examiner—David Brunsman
(74) Attorney, Agent, or Firm—Dennis G. LaPointe; Mason Law, P.A.

(57) ABSTRACT

Coating compositions containing a bituminous material and an effective amount of a methyl/ethyl ester diluent for coating bulk solids are disclosed. The coating compositions of the present invention are particularly suited to reduce dust formation and cake formation in fertilizer and coal.

16 Claims, No Drawings

COATING COMPOSITIONS CONTAINING METHYL/ETHYL ESTERS AND METHODS OF USING SAME

RELATED APPLICATION

This application is a continuation-in-part of application Ser. No. 09/784,570 filed Feb. 15, 2001.

BACKGROUND OF THE INVENTION

1. Field of the Invention

This invention relates, generally, to coating compositions and methods of using same. In particular, the compositions of the present invention are used to coat bulk solids. These coating compositions contain a bituminous material and an effective amount of a methyl/ethyl ester diluent. The compositions of the present invention are particularly suited to reduce dust formation and cake formation in fertilizers and for dust control of coal dust or powder.

2. Description of the Related Art

The storage and handling of bulk materials present unique problems relating to both dust formation and/or cake formation. Specifically, dust formation and dissemination pose safety, health and environmental problems. Cake formation presents problems in storing and handling of bulk materials.

These problems are particularly problematic in the fertilizer industry. Specifically, fertilizers, which are generally in powder, crystalline or granular forms have a tendency to cake. Over time fertilizers form more or less solid masses due to changes in humidity and/or temperature. Prior to application the fertilizer must be broken up to provide a material that is suitable for even distribution in the field and to prevent clogging of distribution machinery.

Fertilizer dust consists of fertilizer particles that are small and light enough to become airborne. Excessive dust is problematic for both producers and end-users. Specifically, fertilizer dust as well as coal dust create numerous problems, including, problems associated with environmental compliance, worker safety, worker productivity and increased maintenance and repair of handling and storage equipment. In addition, dust levels tend to increase over time and are aggravated by prolonged storage and storage at less than ideal conditions. Further, dust poses a problem of spontaneous combustion. Spontaneous combustion is problematic because it relates to both the processing temperature of fertilizers and coal as well as the storage temperature of the finished products.

Various approaches have been developed to overcome the problems associated with fertilizer caking and dusting, some with a measure of success. For example, fertilizer granulation by agitation with a small amount of water at elevated temperature, mixing fertilizers with inert mineral materials or bulky organic materials, spraying the fertilizer with molten materials, such as, paraffin waxes, asphalts and petroleum resins, to form pellets of uniform size and reduce the points of contact between fertilizer particles have been found to inhibit caking and reduce dust formation for brief periods of time. Other approaches for the reduction of caking and dusting include shipping fertilizers in moisture proof bags or other containers and growing large crystals which are screened to uniform sizes.

Asphalts have been particularly useful in coating fertilizers. In order to produce an asphalt based coating agent it is necessary to reduce the viscosity of the asphalt so that it can be sprayed onto the fertilizer. Traditionally petroleum based oils have been used for this purpose.

Methyl and ethyl esters of fatty acids are well known and find application in many areas, including as a carrier for herbicides in the agricultural area and as a solvent for cleaning equipment used in the asphalt industry.

Some of the treatments described above which are used to improve anti-caking in fact produce dusting problems. In addition, although these additives and treatments may show improved anti-caking and anti-dusting properties, they all reduce the concentration of the nutrients in the fertilizer, resulting in a lower grade product. Further, impregnating or coating the fertilizer particles interferes with the rate of release of nutrients.

Based on the foregoing, asphalts have been used to coat fertilizers and methyl/ethyl esters have been used as carriers for herbicides and solvents for cleaning equipment in the asphalt industry. There has been no suggestion whatsoever, however, that fertilizers coated with asphalts containing methyl/ethyl esters would exhibit superior anti-caking and anti-dusting properties. Accordingly, in view of the prior art at the time the present invention was made, it was not obvious to those of ordinary skill in the pertinent art how the needed fertilizers having improved dust control and reduced caking properties, could be provided, without adversely impacting the quality and/or rate of release of the fertilizer.

SUMMARY OF THE INVENTION

In accordance with the present invention, a composition for coating bulk solids is provided. The bulk solids of the present invention include organic materials, inorganic materials and combinations thereof which are granulated, crushed, compacted, crystalline or prilled solids and combinations thereof. The coating of coal in the above forms is also contemplated within this scope of this invention. The coating contains a bituminous material and an effective amount of an ester diluent. Bituminous materials useful in the present invention include asphalt, asphaltic tars, asphaltic pitches, coal tars, coal pitches and combinations thereof. The ester diluent is a methyl or ethyl ester of fatty acids, oils and combinations thereof derived from animal, plant and synthetic materials. The effective amount of the ester diluent is from about 0.01% to about 99.9% by weight of the total weight of the coating composition.

The viscosity of the coating composition is from about 3 cP to about 20000 cP, preferably from about 3 cP to about 5000 cP, at 60° C. Specifically, the coating compositions useful in the present invention have viscosities, which are less than viscosities of coating compositions containing an effective amount of a petroleum hydrocarbon diluent. More particularly, the viscosity of the coating composition of the present invention is less than that of a coating composition which contains a petroleum hydrocarbon diluent in an amount of from about 0.01% to about 99.9% by weight of the total weight of the coating composition.

Bulk solids coated with these inventive coating compositions generate less dust than those coated with coating compositions containing an effective amount of a petroleum hydrocarbon diluent. Specifically, bulk solids coated with the present coating compositions generate less dust than bulk solids coated with a coating composition containing a petroleum hydrocarbon diluent in an amount of from 0.01% to about 99.9% by weight of the total weight of the coating composition. In addition, bulk solids coated with the coating composition of the present invention cake less than bulk solids coated with a coating composition containing an effective amount of a petroleum hydrocarbon diluent. In fact, bulk solids coated with the coating composition of the present invention cake less than bulk solids coated with a coating composition containing a petroleum hydrocarbon diluent in an amount of from about 0.01% to about 99.9% by weight of the total weight of the coating composition.

The invention accordingly comprises the features, and combination of elements in the following description, and its scope, will be pointed out in the appended claims.

DETAILED DESCRIPTION OF THE INVENTION

The present invention relates to coating compositions and method of using such compositions for bulk solids containing bituminous materials and methyl esters and/or ethyl esters. Preferably these coatings are used to treat fertilizers to reduce both cake and dust formation and coal to reduce coal dust levels. Specifically, it has been found that methyl or ethyl ester diluents advantageously replace prior art petroleum based oil diluents to provide a superior sprayable asphalt coating composition.

In particular, the amount of ester diluent required to achieve a sprayable asphalt composition is considerably less than the amount of petroleum based oil diluent required, resulting in more asphalt at the surface of the fertilizer granule, and hence providing a superior anti-dusting and anti-caking effect. In addition, the flash point of methyl/ethyl esters is greater than that of petroleum based oil diluents resulting in a safer, less combustible, less flammable coating material.

Bituminous materials useful in the present invention include asphalt, asphaltic tars, asphaltic pitches, coal tars, coal pitches and combinations thereof. These bituminous materials are available in a number of grades and from a number of sources. For example, bituminous materials, and asphalt in particular, may be obtained from Marathon Oil Company, Tampa, Fla., The Coastal Corporation, Port Canaveral, Fla. and Mariani Asphalt, Tampa, Fla.

The methyl and/or ethyl esters useful in the present invention can be distilled, following reaction with an appropriate alcohol, by methods known in the art, from various sources including, but not limited to rapeseed oil, sunflower oil, corn oil, safflower oil and soybean oil. The esters useful in the present invention are chains of from 8 to 24 carbon atoms, with the following general formula $CH_3(CH_2)_nC-O-R=O$, wherein n=6–22 and R is $CH_3$ or $CH_2CH_3$. Alternatively, these methyl/ethyl esters may be obtained from Ocean Air Environmental, 1248 George Jenkins Boulevard, Lakeland, Fla. 33801. Methyl esters are the preferred diluents.

The coating compositions are used to coat organic and inorganic fertilizer compositions, as well as combinations thereof. The fertilizer, useful in the present invention, is in a granular, pelletized, crushed, compacted, crystalline or prilled form. Fertilizers may be obtained from numerous sources including Cargill Fertilizer, Bartow, Fla.

The coating compositions of the present invention do not interfere with the quality grade or rate of release of the fertilizer. In particular, the coating compositions of the present invention contain an effective amount of a methyl and/or ethyl ester, which is sufficient to dilute the bituminous material to provide a coating material having a viscosity that is suitable for spraying and even distribution on the bulk solids to reduce dust and cake formation while maintaining the quality and nutrient release rate of the fertilizer. The coating composition of the present invention changes the surface characteristics of the bulk solid, rendering it resistant to caking and dusting during shipment and storage.

EXAMPLES

The following examples serve to provide further appreciation of the invention and are not meant in any way to restrict the effective scope of the invention.

EXAMPLE 1

Determination of Dust Levels

Coating materials were prepared in the following manner.

Fatty acid methyl ester (FAME), obtained from Ocean Air Environmental (OAE), Lakeland, Fla. was mixed with asphalt (AC-5 grade) acquired from Marathon Oil Company, Tampa, Fla. The inventive coating contained 78% asphalt and 22% FAME and had a viscosity of 500 cP at 140° F.

A second coating was prepared by mixing a petroleum hydrocarbon, a paraffinic 175 Saybolt Universal Seconds (SUS) oil, obtained from Young Oil Company, Birmingham, Ala. with asphalt (AC-5 grade) acquired from Marathon Oil Company, Tampa, Fla. The second coating contained 65% asphalt and 35% paraffinic oil and had a viscosity of 500 cP at 140° F.

All viscosities were determined using a Brookefield viscometer.

Bulk materials were coated in the following manner.

Diammonium Phosphate (DAP) fertilizer was obtained from Cargill Fertilizer, Bartow, Fla. Nine 200 g samples of DAP were weighed into wide-mouth, glass quart jars (VWR Scientific, Atlanta, Ga.) and placed in a 140° F. oven.

Samples of the FAME coating and the petroleum hydrocarbon coating described above were also placed in a 140° F. oven.

After 1 hour, three DAP samples were removed from the oven and coated with the petroleum hydrocarbon coating at a rate of 0.5 gal/ton of DAP.

Three additional DAP samples were coated with the FAME coating at a rate of 0.5 gal/ton of DAP.

A final three DAP samples were left as uncoated controls.

The treatment process was the same for all samples, with the exception that nothing was added in a dropwise manner to the uncoated controls. The uncoated controls, however, were subject to tumbling for five minutes as described below.

Specifically, the particular coating was added to each respective container of DAP in a dropwise fashion, followed by rolling each container on a rock tumbler (INDCO, Inc., New Albany, Ind.) for five minutes. A Varitemp® heat gun (Master Appliance Corp., Racine, Wis.), set on high, was directed at each container of DAP during the five-minute tumbling process.

Dust levels of each sample were measured using the dust tower disclosed and claimed in U.S. Pat. No. 6,062,094 which is incorporated herein by reference, in its entirety. Dust levels were measured at 0-days (initial), 7-days, and 14-days. The results of these dust level determinations are shown in Table 1 below.

TABLE 1

Dust Reduction Data Of Coated and Uncoated DAP.

| Coating | Coating rate (gal/ton) | | | | | |
|---|---|---|---|---|---|---|
| | | Initial Dust Levels | | | | |
| | | Dust Level (lbs/ton) | | | Mean Dust Level | Percent Dust |
| | | 1 | 2 | 3 | (lbs/ton) | Reduction |
| CONTROL | | 2.47 | 2.35 | 2.49 | 2.44 | |
| Petroleum coating | 0.5 | 0.06 | 0.05 | 0.04 | 0.05 | 97.95 |
| FAME coating | 0.5 | 0.03 | 0.05 | 0.04 | 0.04 | 98.36 |
| | | 7-day aged dust levels | | | | |
| | | Cumul. Dust Level (lbs/ton) | | | Cumulative Mean Dust Level | Cumulative Percent Dust |
| | | 1 | 2 | 3 | (lbs/ton) | Reduction |
| CONTROL | | 2.58 | 2.79 | 2.63 | 2.67 | |
| Petroleum coating | 0.5 | 0.36 | 0.33 | 0.37 | 0.35 | 86.75 |
| FAME coating | 0.5 | 0.24 | 0.26 | 0.23 | 0.24 | 90.88 |
| | | 14-day aged dust levels | | | | |
| | | Cumul. Dust Level (lbs/ton) | | | Cumulative Mean Dust Level | Cumulative Percent Dust |
| | | 1 | 2 | 3 | (lbs/ton) | Reduction |
| CONTROL | | 2.84 | 2.98 | 2.94 | 2.92 | |
| Petroleum coating | 0.5 | 0.57 | 0.56 | 0.52 | 0.55 | 81.16 |
| FAME coating | 0.5 | 0.29 | 0.28 | 0.33 | 0.30 | 89.73 |

As shown in TABLE 1 the FAME coated DAP produced less dust initially, and at days 7 and 14 when compared to the petroleum hydrocarbon coated DAP. As indicated in TABLE 1 at day zero the initial dust level of the FAME coated DAP and the petroleum hydrocarbon coated DAP are very close with only a 0.41% difference between them, with the FAME coating DAP exhibiting a slightly greater percent dust reduction than the petroleum hydrocarbon coated DAP. At day-7 the FAME coated DAP continues to produce less dust than the petroleum hydrocarbon coated DAP, with a 4.13% difference. The increase in percent dust reduction is maintained at day-14 as well, with the FAME coated DAP generating 8.57% less dust than the petroleum hydrocarbon coated DAP.

These results also indicate that overtime the FAME coated DAP maintains its increased percent dust reduction to a greater extent than the petroleum hydrocarbon coated DAP. Specifically, a comparison of the percent dust reduction levels of the samples at day-7 to the percent dust reduction levels of the samples at day-14 indicate that from day-7 to day-14 the FAME coated DAP has an increase in dust generation of only 1.15% while the petroleum hydrocarbon coated DAP has an increase in dust generation of 5.59%.

EXAMPLE 2
Determination of Cake Strength

Samples (100 g), prepared as described in EXAMPLE 1, of control, FAME coated and petroleum hydrocarbon coated DAP were placed into each of three cylindrical, perforated sample cells. The sample cells were 3.4 inches long with a 2 inch diameter. A pneumatic plunger was placed atop each of the nine samples and pressurized to 25 psi.

The DAP samples were then exposed to a range of temperatures and humidities, as indicated in TABLE 2 below, which accelerate the caking process.

TABLE 2

Accelerated Caking Of Bulk Solids.

| Time (h) | Initial/Final Temp (C.) | Initial/Final Relative Humidity (%) |
|---|---|---|
| 0.5 | 60/60 | 30/30 |
| 2 | 60/45 | 30/75 |
| 1 | 45/60 | 75/30 |

Upon cooling to room temperature, pressure from the pneumatic plungers was removed and the breaking strength of the resultant cake was measured using a ¼" probe attached to a strain gauge. Penetration of the probe to a depth of one inch within the cake, followed by reading the strain gauge value yields the pound strength of the respective cake.

The cake strength, in lbs/in$^2$ (psi), is calculated by dividing the pound strength by the cross-sectional area of the cake. A cake strength ratio is calculated by dividing the average cake strength of a coated sample set (3 samples) by the average cake strength of the control sample set (3 samples). These results are indicated in TABLE 3 below.

TABLE 3

Cake Strength.

| Coating Agent | Coating Rate (gal/ton) | Cake Strength (lbs) | | | Mean cake Strength (lbs) | Cake Strength (psi) | Cake strength ratio |
|---|---|---|---|---|---|---|---|
| | | 1 | 2 | 3 | | | |
| CONTROL | | 8.8 | 9.9 | 9.7 | 9.5 | 3.0 | |
| Petroleum Coating | 0.5 | 4.9 | 5.1 | 5.2 | 5.1 | 1.6 | 0.54 |
| FAME coating | 0.5 | 3.3 | 3.0 | 2.8 | 3.0 | 1.0 | 0.32 |

As shown in TABLE 3, the cake strength (psi) of the inventive coatings is less than that of the prior art petroleum hydrocarbon coating. These results indicate that fertilizers coated with the coatings of the present invention are easier to handle and do not cake as readily as fertilizers coated with petroleum hydrocarbon coatings.

These experimental results demonstrate that the coating compositions of the present invention are superior to the prior art coatings, which contain petroleum hydrocarbon diluents.

Improved Dust Control of Coal

The coating was prepared in the same manner as the coating for fertilizer as described above, that is:

A sample of fatty acid methyl ester (FAME) was obtained from Ocean Air Environmental (OAE), Lakeland, Fla. Asphalt (AC-5 grade) was acquired from Marathon Oil Company, Tampa, Fla. A coating consisting of 78% asphalt and 22% FAME was prepared to meet a target viscosity of 500 cps at 140° F. All viscosities were determined using a Brookefield viscometer. A 100% petroleum hydrocarbon coating was prepared from asphalt and a paraffinic 175 Saybolt Universal Seconds (SUS) oil. The 175 SUS oil was obtained from Young Oil Company, Birmingham, Ala. The target viscosity of 500 cps was achieved for the petroleum hydrocarbon coating by blending 65% asphalt with 35% paraffinic oil.

The coal powder was coated as follows:

Coal powder was used as received and sieved for ten minutes using 100 and 200-mesh screens. The coal powder fraction retained on the 100-mesh screen was collected for testing. Nine-200 g samples of coal powder were weighed into wide-mouth, glass quart jars (VWR, Atlanta, Ga.) and placed in a 140° F. oven. Samples of the FAME coating and the petroleum coating described above were also placed in a 140° F. oven. After 1 hour, three coal powder samples were removed and coated at 0.5 gal/ton with the petroleum coating. Three additional coal powder samples were coated at 0.5 gal/ton with the FAME coating. The treatment process involved adding the coating to the container of the coal powder dropwise, followed by rolling the container on a rock tumbler (INDCO, Inc, New Albany, Ind.) for five minutes. A Varitemp® heat gun (Master Appliance Corp, Racine, Wis.), set on high, was directed at the container of coal powder during the five-minute tumbling. The final three coal powder samples were left untreated, to be used as controls.

Resultant Dust Levels

The dust levels of the coated coal powder samples were determined by collecting and weighing the material passing through a 100-mesh sieve. See Table 4 for dust reduction data.

TABLE 4

Average percentage dust fraction for coated versus uncoated coal samples.

| Coating | Coating Rate | Average - 100 Mesh Fraction (%) |
| --- | --- | --- |
| Control |  | 8.7 |
| Petroleum-based | 0.5 gal/ton | 5.8 |
| FAME-based | 0.5 gal/ton | 5.3 |

Thus, while there has been described what are presently believed to be the preferred embodiments of the invention, those skilled in the art will understand that other and further modifications can be made without departing from the spirit of the invention. It is intended that the present invention include all such modifications as come within the scope of the invention as set forth in the claims.

What is claimed is:

1. A coated bulk solid wherein the bulk solid is coal of a form selected from the group of granular, crushed, compacted, crystalline and prilled coal and combinations thereof and the coating composition comprises:
   a bituminous material comprising asphalt, asphaltic tars, asphaltic pitches, coal tars, coal pitches and combinations thereof; and
   an effective amount of an ester diluent selected from the group of methyl and ethyl esters of fatty acids, oils and combinations thereof,
   wherein the coating composition has a viscosity of from about 3 cP to about 5000 cP at 60° C., and
   wherein the coating composition is effective for reducing dust formation and cake formation in the coated bulk solid.

2. The coated bulk solid according to claim 1, wherein the fatty acids, oils and combinations thereof are derived from animal, plant and synthetic materials.

3. The coated bulk solid according to claim 1, wherein the effective amount of ester diluent is from about 15.0% to about 99.9% by weight of the total weight of the coating composition.

4. The coated bulk solid according to claim 3, wherein the bulk solid coated with a bituminous material and an effective amount of ester diluent generates less dust than a bulk solid coated with a composition comprising a bituminous material and a petroleum hydrocarbon diluent in an amount of from about 15.0% to about 99.9% by weight the total weight of the coating composition.

5. The coated bulk solid according to claim 3, wherein the bulk solid cakes less than a bulk solid coated with a composition comprising a bituminous material and a hydrocarbon diluent in an amount of from about 15.0% to about 99.9% by weight of the coating composition.

6. The coated bulk solid according to claim 1, wherein the bulk solid generates less dust than a composition comprising a bituminous material and an effective amount of a petroleum hydrocarbon diluent.

7. The coated bulk solid according to claim 1, wherein the bulk solid cakes less than a bulk solid coated with a composition comprising a bituminous material and an effective amount of a petroleum hydrocarbon diluent.

8. The coated bulk solid according to claim 1, wherein a percent concentration by weight of the coating composition to the bulk solid is about 0.01%–2.0%.

9. A method for controlling dust levels for a bulk solid comprising coal comprising:
   coating the coal with a composition comprising a bituminous material and an effective amount of an ester diluent selected from the group of methyl and ethyl esters of fatty acids, oils and combinations thereof; and
   the bituminous comprising asphalt, asphaltic tars, asphaltic pitches, coal tars, coal pitches and combinations thereof,
   wherein the bulk solid is coal of a form selected from the group of granular, crushed, compacted, cystalline and prilled coal and combinations thereof,
   wherein the composition has a viscosity of from about 3 cP to about 5000 cP at 60° C., and
   wherein the composition is effective for reducing dust formation and cake formation in the coated bulk solid.

10. The method according to claim 9, wherein the fatty acids, oils and combinations thereof are derived from animal, plant and synthetic materials.

11. The method according to claim 9, wherein the effective amount of ester diluent is from about 15.0% to about 99.9% by weight of the total weight of the coating composition.

12. The method according to claim 11, wherein the bulk solid coated with a bituminous material and an effective amount of ester diluent generates less dust than a bulk solid coated with a composition comprising a bituminous material and a petroleum hydrocarbon diluent in an amount of from about 15.0% to about 99.9% by weight the total weight of the coating composition.

13. The method according to claim 11, wherein the bulk solid cakes less than a bulk solid coated with a composition comprising a bituminous material and a hydrocarbon diluent in an amount of from about 15.0% to about 99.9% by weight of the coating composition.

14. The method according to claim 9, wherein the bulk solid generates less dust than a composition comprising a bituminous material and an effective amount of a petroleum hydrocarbon diluent.

15. The method according to claim 9, wherein the bulk solid cakes less than a bulk solid coated with a composition comprising a bituminous material and an effective amount of a petroleum hydrocarbon diluent.

16. The method according to claim 9, wherein a percent concentration by weight of the coating composition to the bulk solid is about 0.01%–2.0 %.

* * * * *